H. K. REINOEHL.
SPRING EYE PROTECTOR FOR AUTOMOBILES.
APPLICATION FILED DEC. 10, 1919.
1,346,682.     Patented July 13, 1920.
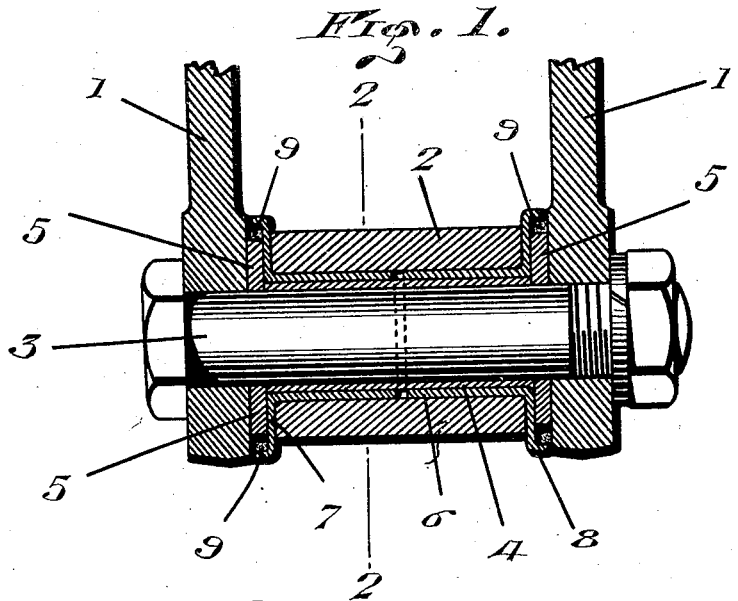
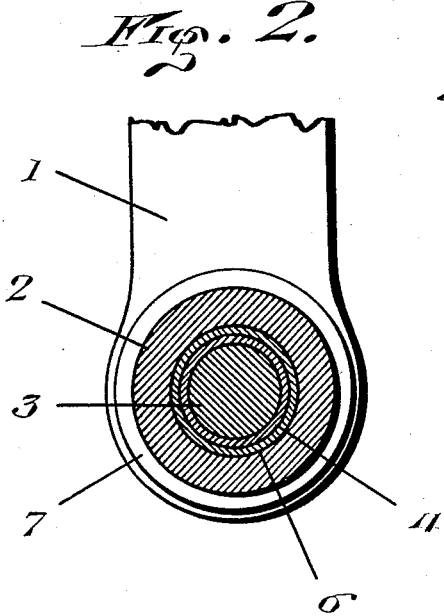
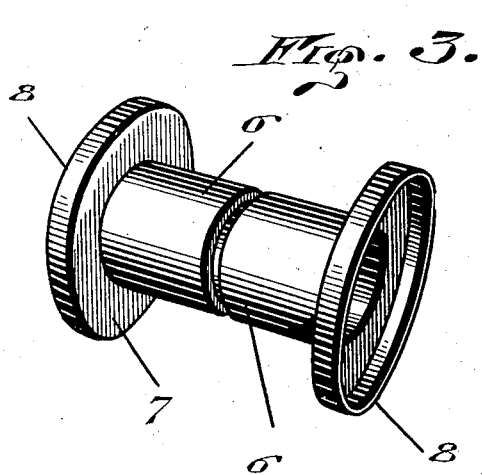
WITNESS:
INVENTOR.
HARRY K. REINOEHL
BY
ATTORNEY.

UNITED STATES PATENT OFFICE.

HARRY K. REINOEHL, OF DEFIANCE, OHIO.

SPRING-EYE PROTECTOR FOR AUTOMOBILES.

1,346,682.

Specification of Letters Patent.   Patented July 13, 1920.

Application filed December 10, 1919. Serial No. 343,729.

*To all whom it may concern:*

Be it known that I, HARRY K. REINOEHL, a citizen of the United States, residing at Defiance, in the county of Defiance and State of Ohio, have invented certain new and useful Improvements in Spring-Eye Protectors for Automobiles, of which the following is a specification.

The present invention relates to lubrication protectors for spring eye bearings for automobiles. In order to successfully lubricate any mechanical bearing two fundamental principles must be followed; first, all foreign matter, especially dirt, dust, and similar abrading matter, must be entirely excluded; and, secondly, the lubricant must not be allowed to escape, but must be kept in contact with the bearing surfaces. These principles and their logical results have been more or less perfectly followed and attained in the lubrication of various units of the present day automobile, such as motors, transmissions and rear axles and hubs. In these instances various methods have been used, such as return grooves in the bearings, felt retainers, gaskets, packing glands, etc. But the chassis spring eye bearing, only slightly developed in this respect, is the source of most of the annoying squeaks, rattles, etc. More perfect lubrication will avoid the squeaks at this point, and better packing will avoid the rattles and other sounds. The present device is especially designed to provide perfect lubrication, avoid the squeaks and rattles, exclude foreign matter from the bearing, retain the lubrication on the bearing surfaces, provide an uninterrupted thrust surface, and permit the use of a thin section bushing. It is of extremely simple construction which may be used without changing the present standard construction of springs; can be used either with a bearing lubricated with oil or graphite treated bushing and thrust washer; has a very neat appearance; and can be produced rapidly in large quantities and at a low initial cost.

Although the invention has been shown as applied to the spring eye bearing of an automobile, probably its most general use, it is evident that it may be equally well applied in many other places and under a great variety of conditions.

In the drawings:

Figure 1 is a central longitudinal cross section through the invention as applied to a spring eye bearing for automobiles.

Fig. 2 is a cross section of the same at right angles thereto, and

Fig. 3 is a perspective of one member or element of the invention removed.

As shown in the accompanying drawings, the invention is applied to an automobile spring eye and shackle of usual and well known standard construction. Briefly, this standard construction comprises the shackles 1, spring eye 2 therebetween, shackle bolt 3, passing through the eye and shackles, spring eye bushing 4 surrounding the shackle bolt, thrust washers 5 about the ends of bolt 3 and between the ends of the spring eye and the inner faces of the shackles 1. Concentric with each thrust washer is an annular felt washer 9. The construction so far described is usual and well known, and more or less standard. In it the bushing 4 is lubricated. With this standard construction is used a lubrication protector comprising two similar elements of substantially the shape of a spool minus one end. Each comprises a cylinder 6 having at one end an annular flange 7 of considerably greater diameter than the cylinder and extending around the cylinder end in a plane at right angles to the longitudinal axis of the cylinder, while from the perimeter of this flange a second and much narrower flange 8 extends in the same direction as the length of the cylinder 6. The two flanges 7 and 8 thus form a shallow cup at one end of each of the two elements adapted to receive the thrust and felt washers, as clearly shown.

In applying the invention the two elements of the protector will be slipped into opposite ends of the spring eye until the inner faces of their flanges 7 engage the eye ends, leaving the inner ends of their cylindrical portions 6 very slightly spaced; next the bushing 4 is slipped into the assembled protector. Then the felt washers are seated within the cupped ends and the thrust washers are seated within these felt washers. Thus assembled it is ready to be coupled to the shackles 1 by passing the shackle bolt 3 through one shackle, bushing 4 and thrust washers 5 and out through the other shackle.

When assembled, the ends of flanges 8 are in constant though light engagement with the inner faces of the shackles, thus maintaining the elements in their most effective or most completely inserted positions with the least possible space between their inner ends, as clearly shown in Fig. 1.

It will be noticed that the two elements are exact duplicates and completely interchangeable one for the other. Also, it will be noticed that the device may be almost instantly placed in position and with a minimum amount of effort, and it provides a complete, continuous, and uninterrupted thrust surface for the spring eye circumferentially therein. The protector thus assembled completely incloses the bushing and prevents any possible escape of lubricant, thereby avoiding squeaking and at the same time preventing wearing down and looseness of the bushing and consequent rattling. Rattling is similarly prevented between the shackles and spring eye ends by preservation of the washers 5 and 6 within the cupped ends and by engagement between the shackles and ends of flanges 8. Obviously, where the wear is thus prevented and the lubrication so completely retained, a much thinner bushing may be used. Also, it is clear that any usual and well known form of bushing adaptable for these constructions may be equally well used in place of the one here shown.

The construction here disclosed is simply one preferred form of the invention selected for purposes of illustration, and it is clear that many changes may be made in the construction of various parts of the device and in their shape and arrangement, as well as changes in the assembling and use thereof, without in any degree departing from the field and scope of the invention and it is meant to include all such within this application.

Having described my invention, what I claim and desire to protect by Letters Patent is:

1. A lubrication protector for spring-eye bearings comprising a pair of elements each having a cylindrical portion said cylindrical portions being adapted to enter opposite ends of a bearing and lie in contact therewith, and each having a cupped outer end.

2. A lubrication protector element for spring-eye bearings comprising a cylindrical portion having a cupped end, said cylindrical portion being adapted to be slipped longitudinally into said spring-eye from one end, while the cupped end lies beyond the spring-eye.

3. A lubrication protector element for spring-eye bearings comprising a cylindrical portion having at one end an annular flange extending in a plane at right angles to the longitudinal axis of said cylindrical portion, and also having a second annular flange circumferentially of said first flange and extending in a direction parallel to the length of said cylindrical portion, said cylindrical portion being adapted to be slipped longitudinally into said spring-eye from one end, and lie in contact with the spring-eye bearing.

4. A lubrication protector element for spring-eye bearings comprising a cylindrical portion presenting a continuous and unbroken surface and having a cupped end, said cylindrical portion being adapted to be slipped longitudinally into said spring-eye from one end, and lie in contact with the spring-eye bearing.

5. A lubrication protector for spring-eye bearings comprising a pair of cylinders adapted to fit about a bushing, and to be slipped longitudinally along said bushing within a spring-eye from opposite ends of the spring-eye, each cylinder being provided with a flange.

In testimony whereof I affix my signature.

HARRY K. REINOEHL.